(12) United States Patent
Seal et al.

(10) Patent No.: US 7,178,011 B2
(45) Date of Patent: Feb. 13, 2007

(54) PREDICATION INSTRUCTION WITHIN A DATA PROCESSING SYSTEM

(75) Inventors: David James Seal, Cambridge (GB); Vladimir Vasekin, Cambridge (GB)

(73) Assignee: Arm Limited, Cambridge (GB)

( * ) Notice: Subject to any disclaimer, the term of this patent is extended or adjusted under 35 U.S.C. 154(b) by 318 days.

(21) Appl. No.: 10/765,867

(22) Filed: Jan. 29, 2004

(65) Prior Publication Data

US 2004/0250051 A1 Dec. 9, 2004

(51) Int. Cl.
*G06F 9/40* (2006.01)
(52) U.S. Cl. .................................... 712/226
(58) Field of Classification Search ................ 712/226, 712/233, 234, 228, 244
See application file for complete search history.

(56) References Cited

U.S. PATENT DOCUMENTS

| | | | | |
|---|---|---|---|---|
| 5,659,722 | A * | 8/1997 | Blaner et al. | 712/234 |
| 6,009,512 | A * | 12/1999 | Christie | 712/226 |
| 6,023,751 | A * | 2/2000 | Schlansker et al. | 712/1 |
| 6,041,399 | A | 3/2000 | Terada et al. | 712/24 |
| 6,157,996 | A | 12/2000 | Christie et al. | 712/218 |
| 6,233,676 | B1 * | 5/2001 | Henry et al. | 712/233 |
| 6,353,883 | B1 * | 3/2002 | Grochowski et al. | 712/240 |
| 6,640,315 | B1 * | 10/2003 | Hwu et al. | 714/17 |
| 6,886,094 | B1 * | 4/2005 | Blandy | 712/244 |
| 6,910,123 | B1 * | 6/2005 | Bosshart | 712/226 |
| 2002/0019929 | A1 | 2/2002 | Kurata | 712/226 |

FOREIGN PATENT DOCUMENTS

| | | |
|---|---|---|
| EP | 1 267 258 A3 | 12/2002 |
| JP | 62-259140 | 11/1987 |
| JP | 10-27102 | 1/1998 |
| JP | 2002-24008 | 1/2002 |

OTHER PUBLICATIONS

D. Pnevmatikatos et al, "Guarded Execution and Branch Predication in Dynamic ILP Processors" *Computer Architecture News*, vol. 22, No. 2, Apr. 1994, pp. 120-129.
G. Tyson et al, "Evaluating the Effects of Predicated Execution on Branch Prediction" *International Journal of Parallel Programming*, vol. 24, No. 2, Apr. 1996, pp. 159-186.
W. Hwu, "Introduction to Predicated Execution" *IEEE Computer Society*, vol. 31, No. 1, Jan. 1998, pp. 49-50.
D. August et al, "Integrated Predicated and Speculative Execution in the Impact Epic Architecture" *IEEE Computer Society*, Proceedings Jun. 1998, pp. 227-237.
PCT/GB2003/005674 International Preliminary Examination Report, dated Nov. 21, 2005.
M.J. Mahon et al, "Hewlett-Packard Precision Architecture: The Processor" *Hewlett-Packard Journal*, vol. 37, No. 8, Aug. 1986, pp. 4-21.

* cited by examiner

*Primary Examiner*—Eric Coleman
(74) *Attorney, Agent, or Firm*—Nixon & Vanderhye P.C.

(57) ABSTRACT

Within a data processing system, prediction instructions are provided which add conditional behaviour to associated program instructions.

39 Claims, 5 Drawing Sheets

IT { x { y { z }}} <cond>

ITE <cond> # if_size # else_size

PREDICATION INSTRUCTION WITHIN A DATA PROCESSING SYSTEM

BACKGROUND OF THE INVENTION

1. Field of the Invention

This invention relates to the field of data processing systems. More particularly, this invention relates to the conditional execution of program instructions within such data processing systems.

2. Background

It is known to provide data processing systems responsive to instructions sets which include program instructions that are conditionally executed or not executed depending upon the results of previous processing operations. As an example, the ARM 32-bit instruction set is fully conditional in that all instructions include a 4-bit condition code field specifying which conditions will suppress or allow execution.

Whilst the fully conditional 32-bit ARM instruction set is powerful in its conditional behaviour, the 4-bits dedicated to condition codes within each instruction represents a significant proportion of the bit coding space of the instruction set. In many cases the full capabilities of the condition codes are not utilised and the 4-bit dedicated to these condition codes are not well used.

It is also known to provide non-conditional instruction sets such as the Thumb instruction set supported by ARM processors. Not dedicating any instruction bits space to condition codes allows Thumb instructions to be smaller thereby improving code density. However, a disadvantage of this approach is that the number of instructions needed to perform certain operations maybe greater and processing consequently slower without the ability to exploit the condition codes of the 32-bit ARM instruction set.

It is known from other processors such as the PA-RISC processor, to provide instructions which can annul the next instruction depending upon their result. An example of such an instruction would be a compare operation which served to either suppress or allow the next following instruction to execute depending upon whether the numbers compared were equal or not equal. Whilst such annul next instruction types are useful, they have limited flexibility in that they only serve to annul the next instruction dependent upon their own processing.

SUMMARY OF THE INVENTION

Viewed from one aspect the present invention provides apparatus for processing data, said apparatus comprising:

data processing logic operable to perform data processing operations; and an instruction decoder operable to decode program instructions to control said data processing logic to perform said data processing operations, where in said instruction decoder is responsive to a predication instruction to control said data processing logic to either execute or not execute one or more associated program instructions in dependence upon one or more condition states of said apparatus for processing data set by execution of one or more program instructions other than said predication instruction.

The invention recognises that the provision of special purpose predication instructions can be strongly advantageous in that these can render conditional the execution of other instructions dependent upon condition states of the processor that may be more flexibly specified. Thus, programmers and compilers can make better use of such predication instructions to produce smaller and faster programs.

Whilst it is possible that the predication instruction may influence only one other instruction, in preferred embodiments the predication instruction is provided to control the execution of a plurality of associated program instructions.

Whilst the predication instruction could be used in conjunction with associated program instructions that were partially or wholly conditional, preferred embodiments of the invention are ones in which the predication instruction is used with associated program instructions that are non-conditional. Thus, the predication instruction is able to add conditional instruction behaviour to otherwise non-conditional instruction sets.

Whilst the condition states upon which the predication instruction bases its control of associated program instructions can take a variety of different forms, preferred embodiments use condition code flags, such as, for example, a zero flag, an equal flag, carry flag etc in order to provide input to the predication instruction.

The condition states evaluated by the predication instruction to control the associated program instructions could be evaluated at different times depending upon the requirements of a particular system. It is possible that the condition states could be evaluated once upon execution of the predication instruction and the result of that evaluation used to control all of the associated program instructions. This has the advantage of making it possible to fully evaluate the predication instruction early in an instruction pipeline and thereafter possibly remove the predication instruction from the instruction pipeline in a manner that speeds and simplifies execution. As an alternative, it is also possible that the condition states may be evaluated prior to execution of each associated program instruction such that the condition codes may for example, be passed for some associated instructions and fail for other associated instructions. This approach has the advantage of allowing a finer degree of control of the conditional behaviour in a manner that is well suited to many common types of data processing operations which it may be desired to implement with such conditional instruction behaviour.

Whilst it will be appreciated that the associated instructions may have a variety of different relative locations to the predication instruction, preferred embodiments are ones in which the associated program instructions immediately follow the predication instruction. This is convenient for implementation and programming purposes.

It is possible to arrange the predication instruction to control associated program instructions in a variety of different ways. In one possible preferred embodiment the associated program instructions are arranged into two blocks of instructions with one such block being executed upon a condition code pass and the other block being executed upon a condition code failure. This can provide behaviour similar to an If . . . Then . . . Else type of instruction.

In such embodiments whilst the different blocks of instructions could have fixed sizes, it is preferred that they have variable sizes which are specified by fields within the predication instruction itself. This allows flexibility in the block size, convenient control of the branching and other behaviour of the predication instruction and improved code density.

Whilst it is possible that the predication instruction may be dedicated to a particular set of predetermined conditions, in preferred embodiments the predication instruction includes a variable field through which the predetermined conditions may be specified.

Another type of predication instruction which gives an advantageous degree of flexibility and in particular allows interleaving of instructions which will and will not pass their condition codes is one in which the predication instruction includes one or more fields each specifying if a respective associated program instruction is to be executed or not executed depending upon a comparison of the one or more condition states with one or more predetermined states.

More particularly in preferred embodiments the predication instruction can include a field specifying for each respective associated instruction whether the one or more condition states or a compliment of the one or more condition states is to be compared with the predetermined states to determine if the respective associated program instruction is executed. Thus, individual associated program instructions can be specified to execute on either the "Then" condition or the "Else" condition.

In order to facilitate control of the processing system the normal program counter register is complemented by a predicated instruction counter register operable to store a count value indicative of how many of the one or more associated program instructions subject to the predication instruction have been executed. The predication instruction effectively has a reach encoded within it specifying how many associated program instructions it controls and the system needs to keep track of how far through this reach execution has progressed and when this reach has been exceeded.

This predicated instruction count register is particularly useful in the handling of exceptions and the return from exceptions whereby upon returning from an exception the predicated instruction count register may be restored and its value used to determine whether or not the program instruction being returned to is one which has its behaviour influenced by a preceding predication instruction.

It is possible that as well as controlling whether or not the associated program instructions do or do not execute in dependence upon the predication instruction, the predication instruction may also be used to modify the associated instructions such that they have different operations when they are executed. This can be seen as effectively extending the instruction set.

A particularly preferred way of modifying the associated program instructions is to block them from making any changes to the one or more condition states when they are subject to a particular predication instruction containing a specific programmable field. Thus, condition code flag updating can be suppressed by a suitable predication instruction.

Viewed from another aspect the present invention provides a method of processing data, said method comprising the steps of:

performing data processing operations with data processing logic; and decoding program instructions with an instruction decoder to control said data processing logic to perform said data processing operations, wherein in response to a predication instruction said instruction decoder controls said data processing logic to either execute or not execute one or more associated program instructions in dependence upon one or more condition states of said apparatus for processing data set by execution of one or more program instructions other than said predication instruction.

Viewed from a further aspect the present invention provides a computer program product comprising a computer program operable to control an apparatus for processing data having data processing logic operable to perform data processing operations and an instruction decoder operable to decode program instructions to control said data processing logic to perform said data processing operations, said computer program comprising:

a predication instruction operable to control said data processing logic to either execute or not execute one or more associated program instructions in dependence upon one or more condition states of said apparatus for processing data set by execution of one or more program instructions other than said predication instruction.

The above, and other objects, features and advantages of this invention will be apparent from the following detailed description of illustrative embodiments which is to be read in connection with the accompanying drawings.

DETAILED DESCRIPTION

Figure 1:
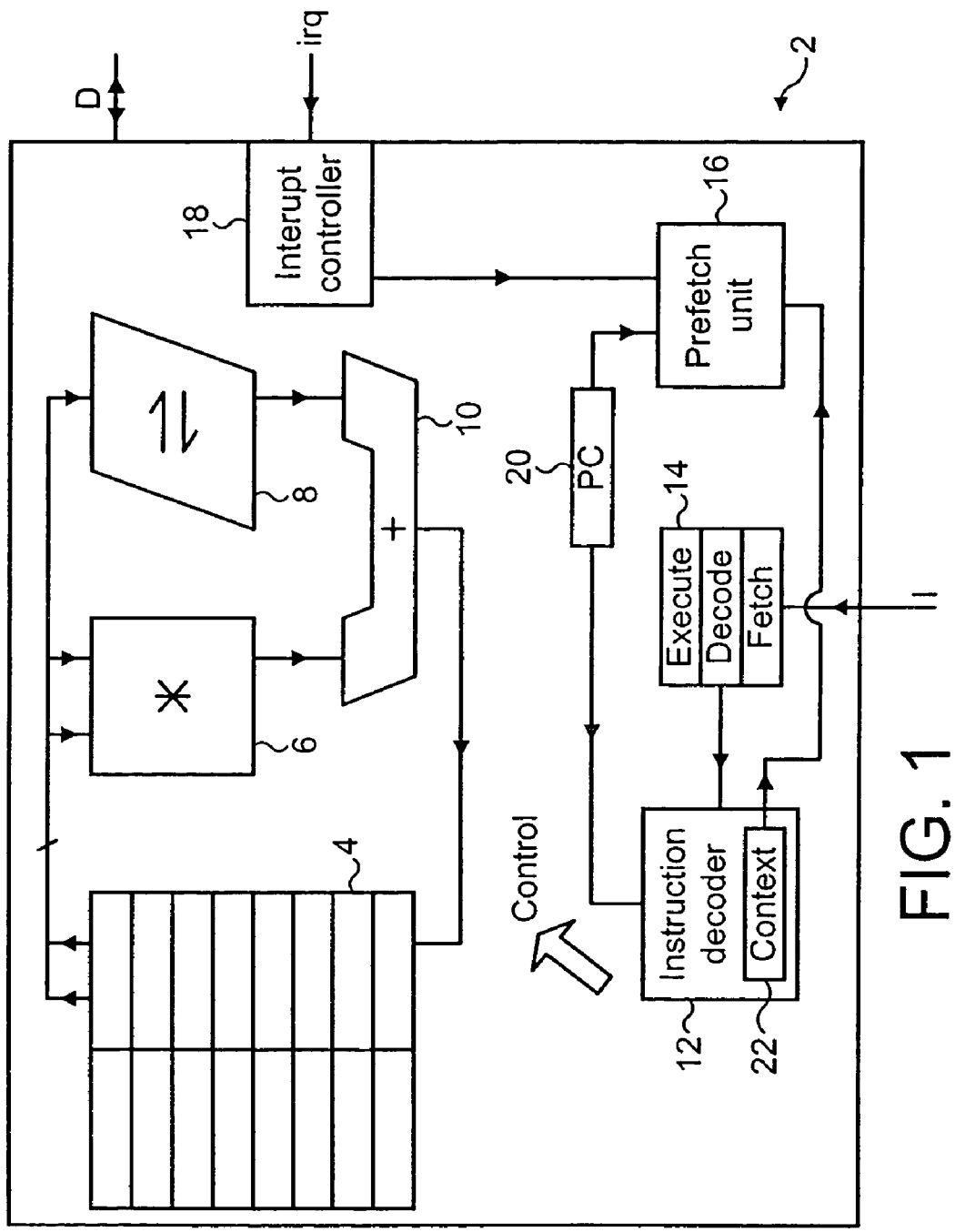
FIG. 1 schematically illustrates a data processing apparatus operable to execute program instructions including predication instructions.

FIG. 1 illustrates a data processing apparatus in the form of a processor core 2 including a program register bank 4, a multiplier 6, a shifter 8, an adder 10, an instruction decoder 12, an instruction pipeline 14, a prefetch unit 16, an interrupt controller 18, a program counter register 20 and a predication instruction counter register 22. It will be appreciated that the processor core 2 will typically include many other circuit elements as will be familiar to those in this technical field, but these circuit elements have been omitted from FIG. 1 for the sake of clarity.

In operation, program instructions I are fetched from a memory (not illustrated) and supplied to the instruction pipeline 14 where they pass through various pipeline stages, such as fetch, decode and execute, as will be familiar in this technical field. Instructions from the decode stage of the instruction pipeline 14 are supplied to the instruction decoder 12 where they serve to generate control signals which configure and control the data processing operation/manipulation being performed by the multiplier 6, the shifter 8, the adder 10 and the other circuit elements such as an ALU (not illustrated), upon data values read from the program register bank 4 to generate a result value to be written back to the program register bank 4. The prefetch unit 16 serves to control the instruction address generation used to fetch program instructions I into the instruction pipeline 14. The program counter register 20 (which may be one of the program registers within the program register bank 4) supplies an address value of the current instruction being executed or an address having a predetermined offset to this value (e.g. +4). A context register 22 also supplies a value to the prefetch unit 16 which is used upon return from an interrupt, as controlled by the interrupt controller 18, so that a partially completed sequence of associated program instructions subject to a predication instruction will still be influenced by the predication instruction even though such execution was interrupted by the occurrence of an exception.

Figure 2:
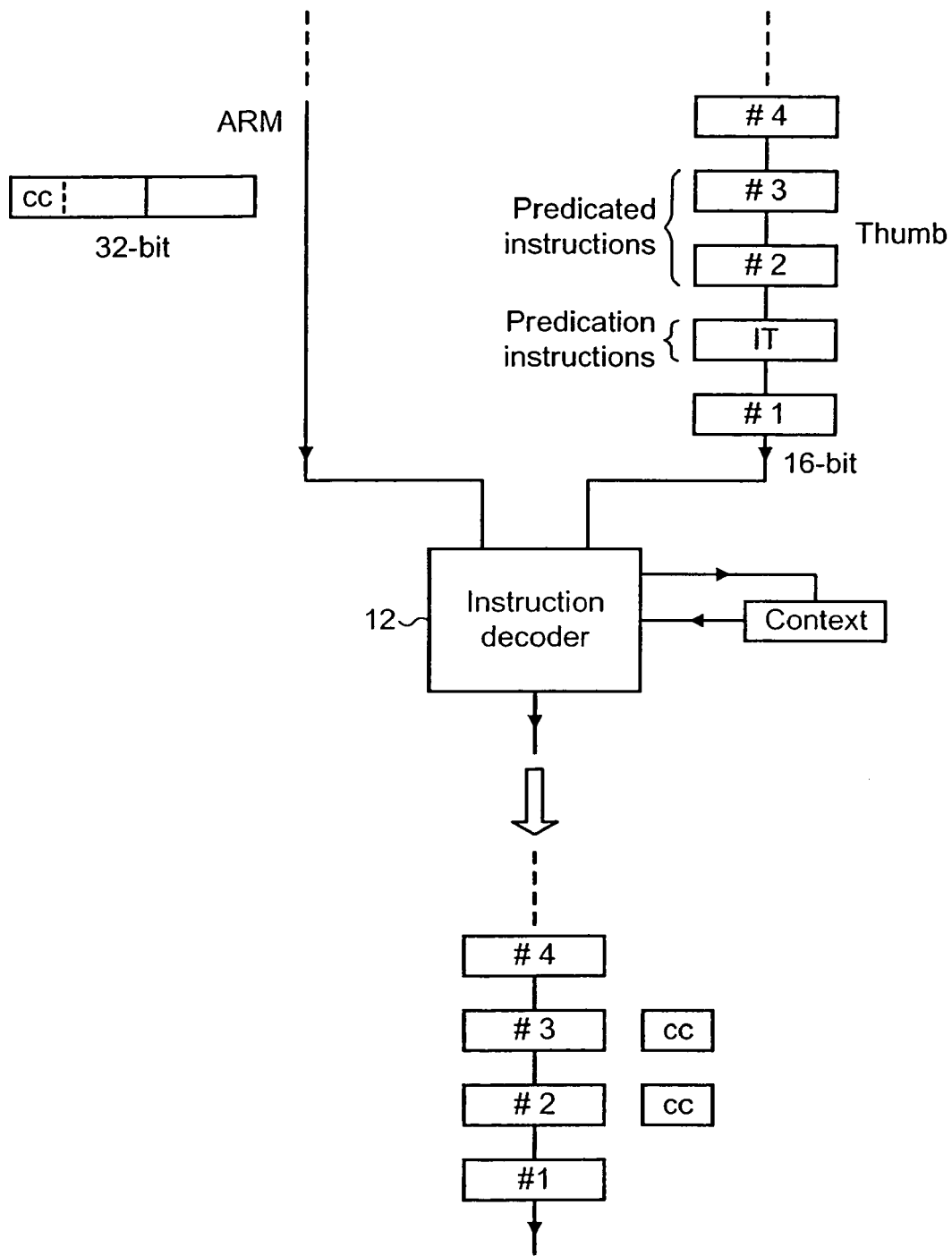
FIG. 2 schematically illustrates the action of an instruction decoder in response to a predication instruction.

FIG. 2 schematically illustrates a first example embodiment in which a predication instruction IT is fed in a stream of program instructions to the instruction decoder 12. When the instruction decoder 12 detects such a predication instruction, it decodes it and effectively adds condition codes to the associated program instructions following the predication instruction within the instruction stream. It will be appreciated that the program instructions within the instruction steam in this example are normally non-conditional instructions, such as 16-bit Thumb instructions which do not normally have condition codes associated with them. However, processors which support the Thumb instruction set also support the 32-bit ARM instruction set which is fully conditional. When instructions from this ARM instruction set are being decoded, then they all include condition codes which are passed on from the instruction decoder 12 down along the instruction pipeline 14 to influence subsequent execution or non-execution of those instructions. Thus, the instruction pipeline 14 is already condition code aware and has the structures and mechanisms for interpreting and responding to condition codes associated with program instructions. At an overall level, it will be seen that the predication instruction IT serves to add condition codes to one or more associated program instructions following it within the instruction stream whilst itself being removed from the instruction stream as it serves no processing function other than this adding of the condition code information.

Figure 3:
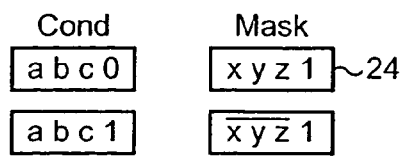
FIGS. 3 and 4 schematically illustrates one form of predication instruction in which individual associated program instructions are controlled either to execute or not to execute dependent upon a mask value and a condition code.

FIG. 3 illustrates the predication instruction IT of FIG. 2 in more detail. In particular, this instruction specifies a condition code "cond" and a mask value "xyx" indicative of whether either 1, 2, 3 or 4 program instructions following the IT instruction are to be subject to its predication and if so the polarity of the condition code to be applied. The condition code or the compliment of the condition code can be applied depending upon whether the corresponding value x, y, z is present for the respective second following, third following and fourth following associated program instructions and the value of this flag. FIG. 3 illustrates how the values x, y, z form a mask value 24 which is terminated by a value of "1".

Figure 4:
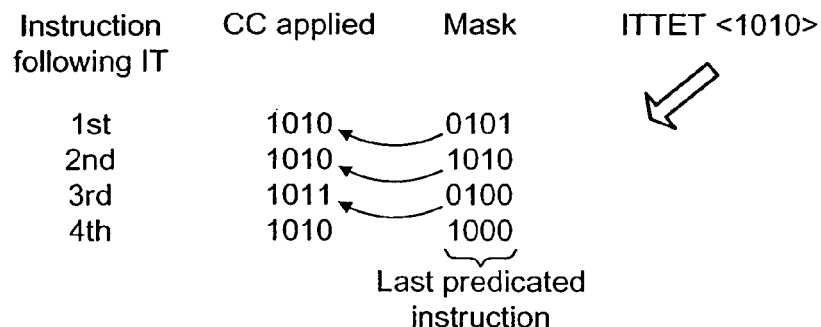

FIG. 4 schematically illustrates an example of such an instruction in which four associated instructions are predicated by the predication instruction. The first of these instructions is considered to be predicated in the "Then" form so that it will be executed if the condition code is met. The second, third and fourth associated instructions can either be specified to be executed upon the "Then" condition or the "Else" condition. In this example, the four associated program instructions have the form Then, Then, Else and Then. Within the mask value 24, the mask value bits x, y, z for the second, third and fourth associated instructions respectively are 0, 1, 0 and the mask value is terminated with a value of "1".

The condition codes specified in this example are "1010". This condition code is applied in its normal form to the first associated instruction. The mask value is then left shifted one position and the most significant bit shifted out of the mask value is shifted into the least significant bit position of the condition code to be applied to the next instruction. Thus, the condition code being applied to the next instruction can be switched between its normal form and its complement form depending upon the most significant bit within the mask value. In this example, it will be seen that the first, second and fourth instructions following the predication instruction are subject to the normal condition code whilst the third instruction following the predication instruction is subject to the complement of the condition code. When the mask value "1000" is detected, this indicates that the last predicated instruction has been reached and the influence of the predication instruction will not extend to subsequent program instructions.

A further description of the type of instruction illustrated in FIGS. 3 and 4 is given in the following:

IT

The If-Then (IT) instruction causes the next N instruction in memory to be conditional. The set of N instructions following the IT instruction and affected by it are known as its "IT block".

It is possible to redefine functionality of some (or all) instructions when they are executed within IT block. For instance, Thumb 16-bit instructions other than CMP/CMN/TST can be not flag setting. In such a case IT can be used with the AL condition to get the latter effect on its own.

An extra PSR bits (or dedicated IT state register) can be used to keep IT states. This would allow interrupts within IT block.

The example below defines Thumb 16-bit IT instruction with a maximum IT block size of 4 instructions. All instructions within IT block are predicated by the same condition or reversed version of condition (i.e. EQ or NE etc.)

Thumb IT

Syntax

IT{<x>{<y>{<z>}}}<cond> where:

<x> If present, is one of the letters "T" and "E", and indicates that a second following instruction is to be affected by the IT instruction. If <x> is "T" ("Then"), the condition attached to that instruction is <cond>; if <x> is "E", it is the inverse of <cond>, obtained by logically inverting <cond>'s least significant bit. If <x> is omitted (and hence <y> and <z> are omitted as well), only one following instruction is affected by the IT instruction.

<y> If present, is one of the letters "T" and "E", and indicates that a third following instruction is to be affected by the IT instruction. If <y> is "T" ("Then"), the condition attached to that instruction is <cond>; if <y> is "E", it is the inverse of <cond>, obtained by logically inverting <cond>'s least significant bit. If <y> is omitted (and hence <z> is omitted as well), less than 3 following instructions are affected by the IT instruction.

<z> If present, is one of the letters "T" and "E", and indicates that a fourth following instruction is to be affected by the IT instruction. If <z> is "T" ("Then"), the condition attached to that instruction is <cond>; if <x> is "E", it is the inverse of <cond>, obtained by logically inverting <cond>'s least significant bit. If <z> is omitted, less than 4 following instructions are affected by the IT instruction.

<cond> Is the condition to be applied to the first following instruction, and possibly to further following instructions as specified by <x>, <y> and <z>.

The values of <x>, <y> and <z> determine the value of the mask field of the instruction according to the following table:

| <x> | <y> | <z> | Mask [3] | [2] | [1] | [0] |
|---|---|---|---|---|---|---|
| Omitted | Omitted | omitted | 1 | 0 | 0 | 0 |
| T | Omitted | omitted | cond[0] | 1 | 0 | 0 |
| E | Omitted | omitted | NOT cond[0] | 1 | 0 | 0 |
| T | T | omitted | cond[0] | cond[0] | 1 | 0 |
| E | T | omitted | NOT cond[0] | cond[0] | 1 | 0 |
| T | E | omitted | cond[0] | NOT cond[0] | 1 | 0 |
| E | E | omitted | NOT cond[0] | NOT cond[0] | 1 | 0 |
| T | T | T | cond[0] | cond[0] | cond[0] | 1 |
| E | T | T | NOT cond[0] | cond[0] | cond[0] | 1 |
| T | E | T | cond[0] | NOT cond[0] | cond[0] | 1 |
| E | E | T | NOT cond[0] | NOT cond[0] | cond[0] | 1 |
| T | T | E | cond[0] | cond[0] | NOT cond[0] | 1 |
| E | T | E | NOT cond[0] | cond[0] | NOT cond[0] | 1 |
| T | E | E | cond[0] | NOT cond[0] | NOT cond[0] | 1 |
| E | E | E | NOT cond[0] | NOT cond[0] | NOT cond[0] | 1 |

Note: The basic idea of this syntax is that e.g. "ITTET EQ" says that the 1st, 2nd and 4th following instructions (indicated by the positions of the "T"s in the mnemonic) have EQ conditions attached to them, and the 3rd (indicated by the "E") has an NE condition attached to it.

Operation
if CPSR[26,25,15:10]!=0b00000000 then
   UNPREDICTABLE
else
   if mask=0b0000 then
      UNPREDICTABLE
   else
      CPSR[15:12]=cond
      CPSR[11,10,26,25]=mask
// Instruction-by-instruction update of these CPSR bits then causes
// the conditional execution effect of the IT instruction to occur.

The 8 IT execution state bits encode one of 256 "inter-instruction states", as follows:

| CPSR 26 | 25 | 15 | 14 | 13 | 12 | 11 | 10 | State |
|---|---|---|---|---|---|---|---|---|
| P4 | 1 | condbase | P1 | P2 | P3 | | | Next 4 instructions are to be executed conditionally, with conditions (condbase, P1), (condbase, P2), (condbase, P3) and (condbase, P4) |
| 1 | 0 | condbase | P1 | P2 | P3 | | | Next 3 instructions are to be executed conditionally, with conditions (condbase, P1), (condbase, P2) and (condbase, P3) |
| 0 | 0 | condbase | P1 | P2 | 1 | | | Next 2 instructions are to be executed conditionally, with conditions (condbase, P1) and (condbase, P2) |
| 0 | 0 | condbase | P1 | 1 | 0 | | | Next instruction is to be executed conditionally, with condition (condbase, P1) |
| 0 | 0 | N (nonzero) | 0 | 0 | | | | UNPREDICTABLE |
| 0 | 0 | 0 | 0 | 0 | 0 | 0 | 0 | Normal execution |

The effects of these bits on subsequent execution are:
  MRS and SRS instructions will read these bits normally. MSR instructions will write them normally to SPSRS, but ignore the written values when writing to the CPSR, as described above. Existing exception return instructions (those with "copy SPSR→CPSR" side-effects) and the RFE instructions will write them normally in the CPSR, also as described above.
  During ARM and Java state execution, these bits Should Be Zero (i.e. the results are UNPREDICTABLE if they are not zero).
  Exception entry sequences cause these bits to be copied from the CPSR to the SPSR and then cleared in the CPSR (along with J and T), returning the processor to normal ARM execution.
  During Thumb state execution:
    1. When the IT instruction is executed, these bits Should Be Zero. (I.e. IT instruction are banned from appearing within the blocks of instructions affected by other IT instructions.)
    2. When a conditional branch instruction is executed, bits[26,25,11,10] Should Be Zero. (I.e. conditional branch instructions are banned from appearing within the blocks of instructions affected by IT instructions. Unconditional branch instructions may appear there, however, and will be caused to be treated as conditional: this rule is basically present to avoid problems caused by having two conditions on the same instruction.)
    3. For all instructions not made UNPREDICTABLE by the above rules, a condition is generated from the current "execution state" bits, as follows:
       if bits[26,25,11,10]=0b0000 then
          /* not in an IT block */
          condition is AL
       else
          condition is bits[15:12], interpreting both 0b1110 and 0b1111 as "always"
          /* NOTE: this interpretation has been standard since "NV space" was recovered in ARMv5*/
       Furthermore, 16-bit Thumb data-processing instructions that are not CMP, CMN or TST instructions and that normally set the condition flags are modified as follows:
       if bits[26,25,11,10]!=0b0000 then
          /* in an IT block */
          instruction does not set condition flags
          Note: This is essential for IT to be useful for controlling a lot of instruction sequences—for example, if it is used to conditionalise an LDR Rn; ADD Rn,Rn,#M; STR Rn sequence, it would be useless if the ADD changed the condition flags seen by the STR instruction!

Note: This has the corollary that an IT instruction with an AL condition (or an NV condition) can be used to suppress such flag-setting by 1–4 following instructions. One of the awkward aspects of the current Thumb instruction set is that late-inserted code (e.g. spill/fill code) may have the side effect of corrupting the condition flags. Being able to deal with this with a single extra 16-bit instruction could be quite useful.

4. Successful (i.e. not failing any condition check) execution of any PC- modifying instruction will cause the new "execution state" bits to become: For exception return instructions (the ones which do SPSR→CPSR copies, and RFE executed in a privileged mode):
Bits[26,25,15:10] of the value written to the CPSR.
Otherwise:
All zero.

Note: The "Otherwise" case is the basic rule that causes IT only to affect the statically following instructions.

Figure 5:
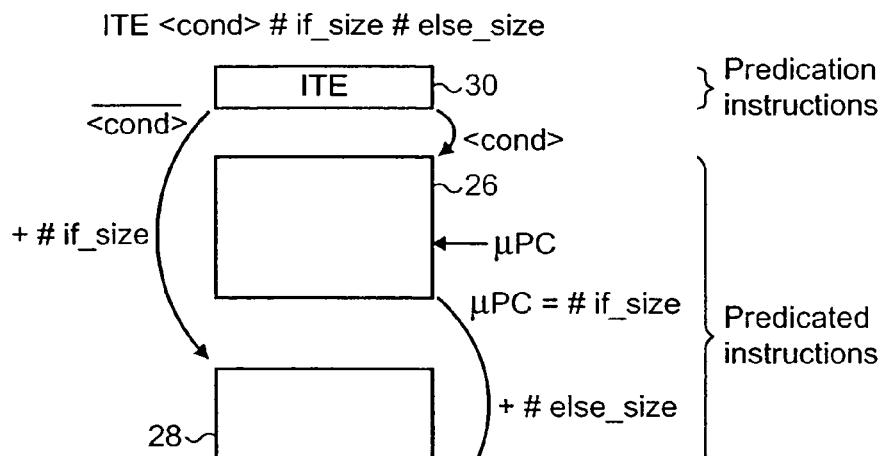
FIG. 5 is a diagram schematically illustrating another type of predication instruction in which blocks of associated instructions are either executed or not executed depending upon the condition codes.

Unsuccessful execution of such a PC-modifying instruction or any execution (successful or not) of a non PC-modifying, non-IT instruction will update the new "execution state" bits as follows:

these blocks of instructions 26 is executed if the condition code specified in the predication instruction 30 is passed and is termed the "If block". The other block of instructions 28 is executed if the condition code associated with the predication instruction 30 is failed and is termed the "Else block". The predication instruction 30 specifies the sizes of these two blocks 26, 28 which may each be from 1–4 instructions in length. In the example of FIG. 5 either the If block 26 or the Else block 28 is executed. This example would be one in which the condition code was effectively evaluated once when the predication instruction 30 was executed and the result of that evaluation applied to predicate all of the associated program instructions. Thus, either the entire If block 26 would be executed or alternatively the entire Else block 28. When the context register 22 (MPC) indicates that the end of the If block has been reached, then a branch is forced to the instruction following the last instruction in the Else block 28. When the last instruction in the Else block 28 is reached, then the effect of the predication instruction 30 is removed.

Figure 6:
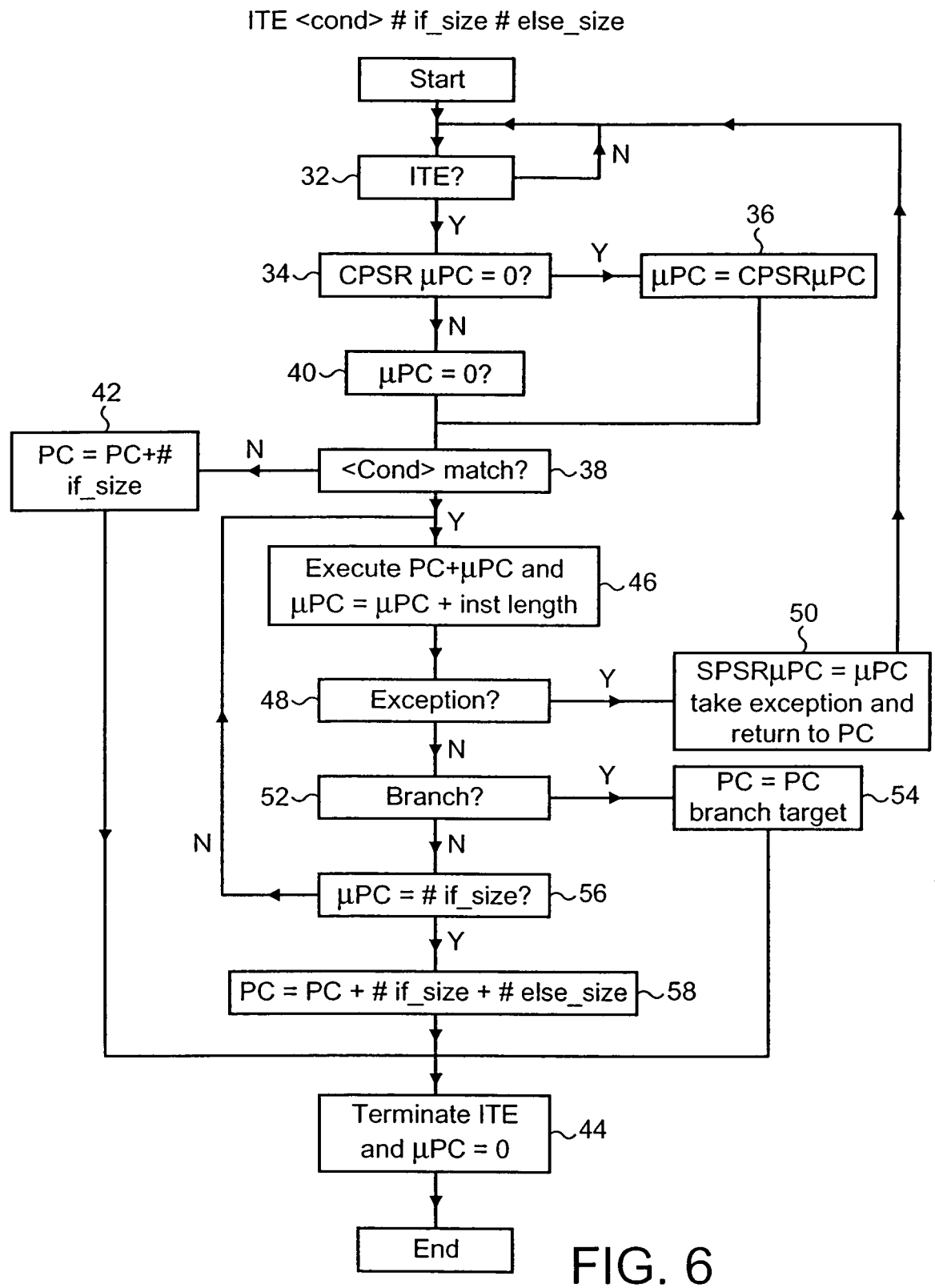
FIG. 6 is a flow diagram schematically illustrating the control of execution following a predication instruction of the type of FIG. 5.
Figure 7:
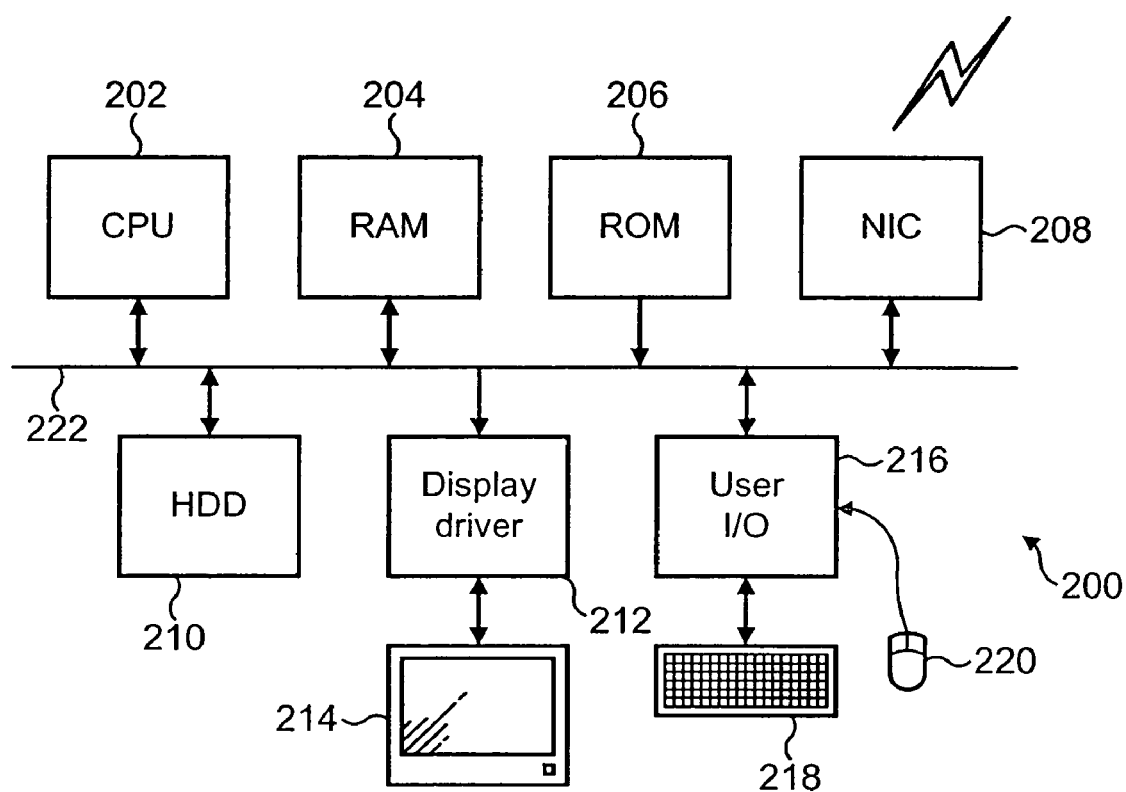
FIG. 7 is a schematic diagram of a general purpose computer apparatus for implementing the above techniques.

FIG. 6 schematically illustrates a flow diagram of the behaviour of the system in accordance with the type of operation shown in FIG. 5. At step 32 the system waits to identify a predication instruction (ITE instruction). At step 34 the system identifies whether the context counter value which is stored within the current program status register is

| Current State | | | | | | | Condition for | New state | | | | | | | |
|---|---|---|---|---|---|---|---|---|---|---|---|---|---|---|---|
| 26 | 25 | 15 | 14 | 13 | 12 | 11 | 10 | state transition | 26 | 25 | 15 | 14 | 13 | 12 | 11 | 10 | Note |
| P4 | 1 | condbase | P1 | P2 | P3 | | | Always | 1 | 0 | condbase | | P2 | P3 | P4 | |
| 1 | 0 | condbase | P1 | P2 | P3 | | | Always | 0 | 0 | condbase | | P2 | P3 | 1 | |
| 0 | 0 | condbase | P1 | P2 | 1 | | | Always | 0 | 0 | condbase | | P2 | 1 | 0 | |
| 0 | 0 | condbase | P1 | 1 | 0 | | | Always | 0 | 0 | 0 | 0 | 0 | 0 | 0 | 0 | A |
| 0 | 0 | Any | | 0 | 0 | | | Always | 0 | 0 | 0 | 0 | 0 | 0 | 0 | 0 | B |

A) Terminating IT execution - but no special action is required.
B) Outside IT block Notes:
1. Branches. Except as noted, no instruction in an IT block is allowed to be the target of any branch, whether as the result of a branch instruction or of some other instruction that changes the PC. Failure to adhere to this restriction can result in UNPREDICTABLE behavior.
2. Exceptions. Interrupts and other exceptions can occur between an instruction and its IT block, or within the IT block. As usual, they will result in an exception handler being entered with suitable return information being placed in the R14 and SPSR of the appropriate mode. Instructions designed for use for exception returns can be used as normal to return from the exception and will resume execution of the IT block correctly. This is the only way in which a PC-modifying instruction is allowed to branch to an instruction in an IT block.
3. IT block. The instructions in an IT block are not allowed to be:
IT instructions
Conditional branch instructions
If they are, the results are UNPREDICTABLE.

FIG. 5 schematically illustrates another type of predication instruction. In this type of predication instruction there are two blocks of associated program instructions 26, 28 associated with the predication instruction 30. The first of non-zero. Such a non-zero value indicates that a return is being made from an exception and accordingly the context value is accepted and stored within the current program status register at step 36 and processing precedes to step 38 at which the condition code specified within the predication instruction is evaluated. Alternatively, the context value is set to zero at step 40 if the test out step 34 produced a no result. If the determination of the condition code evaluation at step 38 was that the condition code failed, then this indicates that the Else block 28 should be executed and accordingly step 42 advances the program counter value to the first instruction within the Else block 28 and then executes the Else block 28 with the predication instruction having been terminated at step 44. Alternatively, if the condition code evaluated at step 38 is passed, then step 46 executes the instruction pointed to by the PC value summed with the context value and increments the context value by the instruction byte length.

Step 48 checks for the occurrence of an exception and if such an exception is present, then step 50 serves to save the current program status register value including the context value (prediction instruction count value), takes the exception, executes the exception handling routine and eventually returns following the exception to the instruction indicated by the program counter value PC, i.e. the predication instruction.

Step 52 tests for the occurrence of a branch and if such a branch occurs then step 54 changes the program counter value to the branch target and step 44 terminates the action of the predication instruction.

Step 56 tests to see if the predication instruction count value has reached the If block size indicating that the end of the If block 26 has been reached. If the end of the If block 26 has been reached, then step 58 serves to move the program counter value on to beyond the end of the Else block and normal processing resumes after the action of the predication instruction has been terminated at step 44. Alternatively, processing returns to step 46 at which the next instruction within the If block is executed.

Another description of the action of the instruction illustrated in FIGS. 5 and 6 is given in the following:

ITE

The If-Then-Else (ITE) instruction allows to specify the size of the block of instructions to be executed when condition is passed (this block is located immediately after instruction), and the size of the block of instructions to be executed when condition is failed (this block is located immediately after "if" block).

A number of ITE context bits should be reserved in the PSR or other special register; we will call these bits PSR_UPC. The exact number of PSR_uPC bits determines the maximum possible size of the "if" block.

Syntax
ITE<cond>#if_size, #else_size

Operation
if PSR_UPC !=0 then
 // return from exception
 uPC=PSR_uPC
else
 uPC=0
if ConditionPassed(cond) then
 PC=PC+if_size
 // Branch to the else part & terminate ITE
loop
 Instr=FetchInstructionFrom(PC+uPC)
 Execute(Instr)
if Exception( ) then
 PSR_uPC=uPC
 PC=ExceptionHandler
 // Take exception
if Branch(Instr) then
 PSR_uPC=0
 PC=BranchTarget
 // Branch & terminate ITE
uPC +=InstructionLength(Instr)
if uPC>=if_size then
 PSR_uPC=0
 PC=PC+if_size+else_size
 // Branch after the else part & terminate ITE
endloop Notes:
 1. Branches. No instruction in an "if" section of ITE is allowed to be the target of any branch, whether as the result of a branch instruction or of some other instruction that changes the PC. Failure to adhere to this restriction can result in UNPREDICTABLE behavior.

2. Exceptions. Interrupts and other exceptions can occur between an instruction within the "if" blocks. As usual, they will result in an exception handler being entered with suitable return information being placed in the R14 and SPSR of the particular exception mode. Instructions designed for use for exception returns can be used as normal to return from the exception and will resume execution of the "if" block correctly. This is the only way in which a PC-modifying instruction is allowed to branch to an instruction in an "if" block.

As an alternative to the form of execution of the predication instruction utilising If blocks 26 and Else blocks 28 which is illustrated in FIGS. 5 and 6, i.e. one in which the condition code is evaluated once when the predication instruction 30 is executed, an alternative in which the condition code is evaluated for each associated program instruction influenced by the predication instruction 30 when that associated instruction is executed may be represented by the following behaviour.

ITE Cond, # THEN, # ELSE
 (0-3) (0-3)
CPSR holds 8 bits: 4 cond [3:0], 2 tlm [1:0], 2 else [1:0]
ITE docs
Cond, then, else=values from instruction
GENERK execution
IF CPSR_then ==0 THEN
 EXECUTE INSTRUCTION NORMALLY
ELSE
 EXECUTE INSTRUCTION WITH CONDITION CPSR_cond
 /* AND IN PARALLEL*/
 IF CPSR_then >1 THEN
  CPSR_then−=1
 ELSE
  CPSR_then=CPSR_else
  CPSR_else=0
  CPSR_cond[0]=NOT (CPSR_cond[0])/*FLIP COND*/

|  |  |  | CPSR_cond | _then | _else |
|---|---|---|---|---|---|
| e.g. | ITE | EQ, #3, #1 | X | 0 | x |
|  | Instr 1 | /*EQ*/ | EQ | 3 | 1 |
|  | Instr 2 | /*EQ*/ | EQ | 2 | 1 |
|  | Instr 3 | /*EQ*/ | EQ | 1 | 1 |
|  | Instr 4 | /*NE*/ | NE | 1 | 0 |
|  | Instr 5 | /*uncond*/ | EQ | 0 | 0 |

It will be seen from the above that in the example the predication instruction specifies an If block containing three associated program instructions and an Else block containing one associated programming instruction. The condition code effectively specified with each of these program instructions is illustrated by the CPSR_cond value. When the Else block has been exited, the fifth instruction is non-predicated and unconditionally executes in the normal way associated with such an unconditional instruction.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   data processing logic operable to perform data processing operations;
   an instruction decoder operable to decode program instructions to control said data processing logic to perform said data processing operations,
   a program counter register operable to store an address indicative of a memory location of a program instruction being executed,
   wherein said instruction decoder is responsive to a predication instruction to control said data processing logic to either execute or not execute one or more associated program instructions in dependence upon one or more condition states of said apparatus for processing data set by execution of one or more program instructions other than said predication instruction,
   a predicated instruction counter register operable to store a counter value indicative of how many of said one or more associated program instructions subject to said predication instruction have been executed,
   wherein said program counter register is configured to continue to store an address corresponding to said predication instruction when said one or more associated program instructions subject to said predication instruction are executing; and
   an exception handling circuit operable upon occurrence of an exception to store said counter value, and upon completion of said exception, to restart execution starting at a program instruction pointed to by said counter value.

2. Apparatus as claimed in claim 1, wherein said predication instruction controls a plurality of associated program instructions.

3. Apparatus as claimed in claim 1, wherein said one or more associated program instructions are non-conditional program instructions.

4. Apparatus as claimed in claim 1, wherein said one or more condition states comprise values of one or more condition code flags.

5. Apparatus as claimed in claim 1, wherein said one or more condition states are evaluated at one of:
   (i) once upon execution of said predication instruction; and
   (ii) prior to executing each associated program instruction.

6. Apparatus as claimed in claim 1, wherein said one or more associated instructions immediately follow said predication instruction.

7. Apparatus as claimed in claim 1, wherein said predication instruction is associated with:
   (i) a condition matching block of one or more program instructions to be executed if said one or more condition states match one or more predetermined conditions; and
   (ii) a condition not matching block of one or more program instructions to be executed if said one or more condition states do not match said one or more predetermined conditions.

8. Apparatus as claimed in claim 7, wherein said predication instruction specifies one or more of:
   (i) a length of said condition matching block of one or more program instructions; and
   (ii) a length of said condition not matching block of one or more program instructions.

9. Apparatus as claimed in claim 7, wherein said predication instruction specifies said one or more predetermined conditions.

10. Apparatus as claimed in claim 1, wherein said predication instruction includes one or more fields each specifying if a respective associated program instruction is to be executed or not executed depending upon a comparison of said one or more condition states with one or more predetermined states.

11. Apparatus as claimed in claim 10, wherein said predication instruction includes a field specifying for each respective associated program instruction whether said one or more condition states or a complement of said one or more condition states is compared with said one or more predetermined states to determine if said respective associated program instruction is executed.

12. Apparatus as claimed in claim 1, wherein said one or more associated instructions specify different data processing operations when subject to said predication instruction.

13. Apparatus as claimed in claim 12, wherein in dependence upon a programmable field within said predication instruction said one or more associated instructions are blocked from making any changes to said one or more condition states.

14. A method of processing data, said method comprising the steps of:
   performing data processing operations with data processing logic;
   decoding program instructions with an instruction decoder to control said data processing logic to perform said data processing operations,
   storing an address indicative of a memory location of a program instruction being executed in a program counter register,
   wherein in response to a predication instruction said instruction decoder controls said data processing logic to either execute or not execute one or more associated program instructions in dependence upon one or more condition states of said apparatus for processing data set by execution of one or more program instructions other than said predication instruction,
   storing in a predicated instruction counter register a counter values indicative of how many of said one or more associated program instructions subject to said predication instruction have been executed;
   continuing to store an address corresponding to said predication instruction in said
   program counter register when executing said one or more associated program instructions; and upon occurrence of an exception storing said counter value and upon completion of said exception restarting execution starting at a program instruction pointed to by said counter value.

15. A method as claimed in claim 14, wherein said predication instruction controls a plurality of associated program instructions.

16. A method as claimed in claim 14, wherein said one or more associated program instructions are non-conditional program instructions.

17. A method as claimed in claim 14, wherein said one or more condition states comprise values of one or more condition code flags.

18. A method as claimed in claim 14, wherein said one or more condition states are evaluated at one of:
   (i) once upon execution of said predication instruction; and (ii) prior to executing each associated program instruction.

19. A method as claimed in claim 14, wherein said one or more associated instructions immediately follow said predication instruction.

20. A method as claimed in claim 14, wherein said predication instruction is associated with:
 (i) a condition matching block of one or more program instructions to be executed if said one or more condition states match one or more predetermined conditions; and
 (ii) a condition not matching block of one or more program instructions to be executed if said one or more condition states do not match said one or more predetermined conditions.

21. A method as claimed in claim 20, wherein said predication instruction specifies one or more of:
 (i) a length of said condition matching block of one or more program instructions; and
 (ii) a length of said condition not matching block of one or more program instructions.

22. A method as claimed in claim 20, wherein said predication instruction specifies said one or more predetermined conditions.

23. A method as claimed in claim 14, wherein said predication instruction includes one or more fields each specifying if a respective associated program instruction is to be executed or not executed depending upon a comparison of said one or more condition states with one or more predetermined states.

24. A method as claimed in claim 23, wherein said predication instruction includes a field specifying for each respective associated program instruction whether said one or more condition states or a complement of said one or more condition states is compared with said one or more predetermined states to determine if said respective associated program instruction is executed.

25. A method as claimed in claim 14, wherein said one or more associated instructions specify different data processing operations when subject to said predication instruction.

26. A method as claimed in claim 25, wherein in dependence upon a programmable field within said predication instruction said one or more associated instructions are blocked from making any changes to said one or more condition states.

27. A computer program product comprising a computer program operable to control an apparatus for processing data in accordance with a method as claimed in claim 14.

28. A computer program product as claimed in claim 27, wherein said predication instruction controls a plurality of associated program instructions.

29. A computer program product as claimed in claim 27, wherein said one or more associated program instructions are non-conditional program instructions.

30. A computer program product as claimed in claim 27, wherein said one or more condition states comprise values of one or more condition code flags.

31. A computer program product as claimed in claim 27, wherein said one or more condition states are evaluated at one of:
 (i) once upon execution of said predication instruction; and
 (ii) prior to executing each associated program instruction.

32. A computer program product as claimed in claim 27, wherein said one or more associated instructions immediately follow said predication instruction.

33. A computer program product as claimed in claim 27, wherein said predication instruction is associated with:
 (i) a condition matching block of one or more program instructions to be executed if said one or more condition states match one or more predetermined conditions; and
 (ii) a condition not matching block of one or more program instructions to be executed if said one or more condition states do not match said one or more predetermined conditions.

34. A computer program product as claimed in claim 33, wherein said predication instruction specifies one or more of:
 (i) a length of said condition matching block of one or more program instructions; and
 (ii) a length of said condition not matching block of one or more program instructions.

35. A computer program product as claimed in claim 33, wherein said predication instruction specifies said one or more predetermined conditions.

36. A computer program product as claimed in claim 27, wherein said predication instruction includes one or more fields each specifying if a respective associated program instruction is to be executed or not executed depending upon a comparison of said one or more condition states with one or more predetermined states.

37. A computer program product as claimed in claim 36, wherein said predication instruction includes a field specifying for each respective associated program instruction whether said one or more condition states or a complement of said one or more condition states is compared with said one or more predetermined states to determine if said respective associated program instruction is executed.

38. A computer program product as claimed in claim 27, wherein said one or more associated instructions specify different data processing operations when subject to said predication instruction.

39. A computer program product as claimed in claim 38, wherein in dependence upon a programmable field within said predication instruction said one or more associated instructions are blocked from making any changes to said one or more condition states.

* * * * *

UNITED STATES PATENT AND TRADEMARK OFFICE
CERTIFICATE OF CORRECTION

| | | |
|---|---|---|
| PATENT NO. | : 7,178,011 B2 | Page 1 of 1 |
| APPLICATION NO. | : 10/765867 | |
| DATED | : February 13, 2007 | |
| INVENTOR(S) | : Seal et al. | |

It is certified that error appears in the above-identified patent and that said Letters Patent is hereby corrected as shown below:

Title Page; After Item (65), please insert

Item --(30) Foreign Application Priority Data

June 5, 2003   (UK)   0312977.2--

Signed and Sealed this

Thirty-first Day of May, 2011

David J. Kappos
*Director of the United States Patent and Trademark Office*